April 25, 1967 W. E. THIERMANN 3,315,976
TWO WHEEL DOLLY

Filed March 22, 1965 3 Sheets-Sheet 1

INVENTOR.
WILLIAM E. THIERMANN
BY
Andrus & Starke
ATTORNEYS

April 25, 1967 W. E. THIERMANN 3,315,976
TWO WHEEL DOLLY
Filed March 22, 1965 3 Sheets-Sheet 2

INVENTOR.
WILLIAM E. THIERMANN
BY
Andrus & Starke
ATTORNEYS

INVENTOR.
WILLIAM E. THIERMANN
BY
Andrus & Starke
ATTORNEYS

United States Patent Office 3,315,976
Patented Apr. 25, 1967

3,315,976
TWO WHEEL DOLLY
William E. Thiermann, 10726 N. Wauwatosa Road 76-W,
Mequon, Wis. 53092
Filed Mar. 22, 1965, Ser. No. 441,737
4 Claims. (Cl. 280—103)

This invention relates to a two wheel dolly of the general type adapted to support a load such as a utility pole, and to be manually manipulated to move the load in any selected direction.

In transporting poles to the site for setting it is often necessary to move them across lawns which need to be protected, and to manipulate them between buildings and through areas that require difficult turning.

Heretofore it has been the practice to use various types of dollies such as the four wheel collapsible dolly illustrated in applicant's U.S. Patent No. 3,125,350. Such a dolly has its limitations from a manipulation standpoint and it was with this in mind that the present invention provides a two wheel dolly which is practically universal in its turning movement.

The dolly of the present invention is also much lighter in weight and easier to manipulate and it can be disassembled more readily for loading in a truck by the crew.

The accompanying drawings illustrate the best mode presently contemplated for carrying out the present invention.

Figure 1:
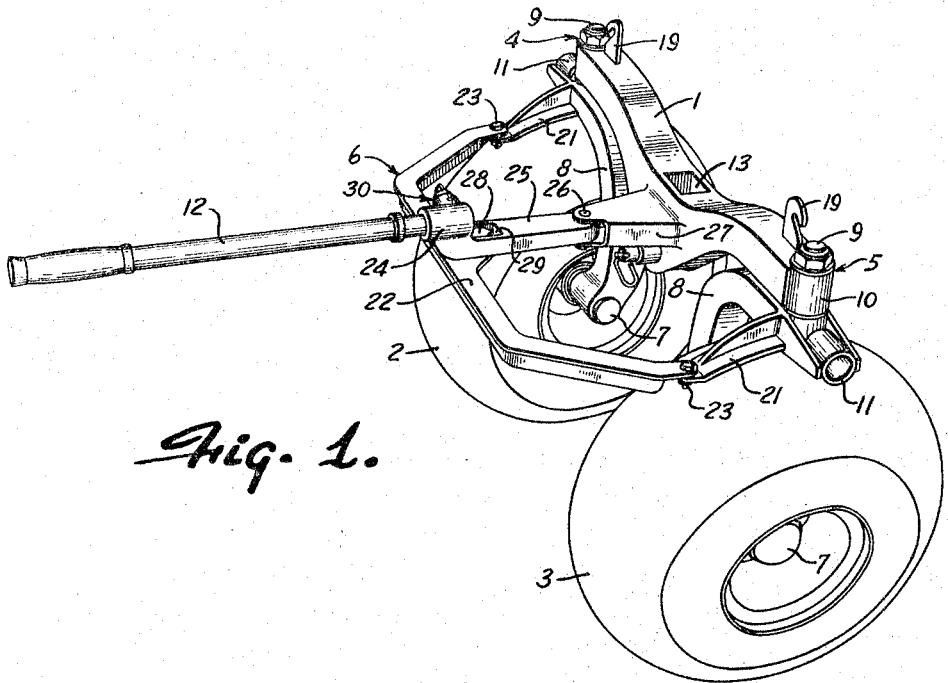
FIGURE 1 is a perspective view of the dolly in an upright position with the wheels straight ahead.
Figure 2:
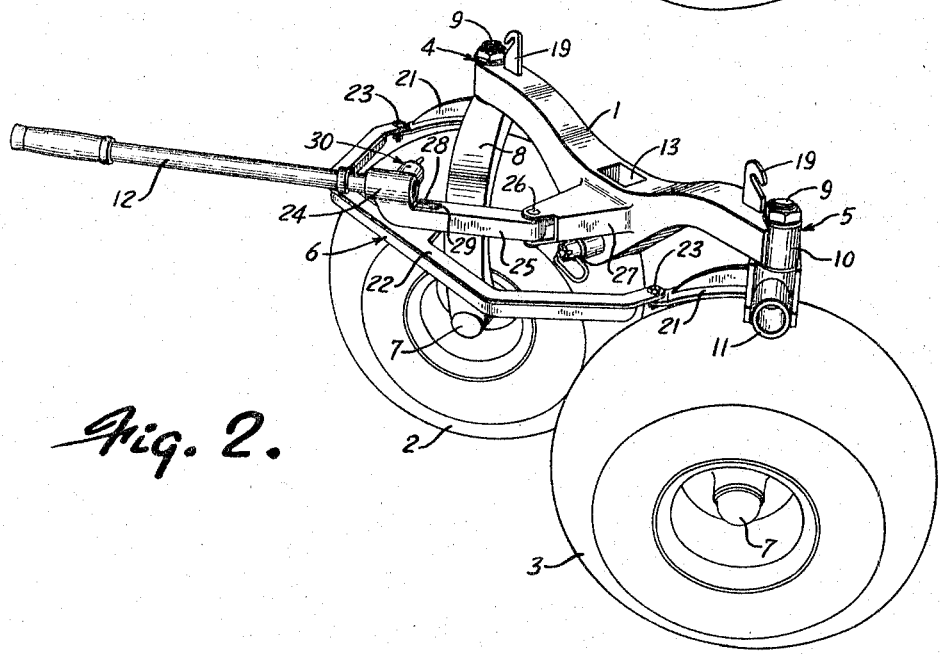
FIG. 2 is a similar view with the wheels directed to steer at an angle.

The dolly illustrated as one embodiment of the invention comprises in general a laterally extending cross frame member 1 supported by a pair of laterally spaced wheels 2 and 3 which are pivoted thereto for steering on vertical pivots 4 and 5 disposed directly above the corresponding wheels centrally thereof, and a steering mechanism 6 attached to steer the wheels in unison and control their position.

More specifically the inner end of the axle 7 of each wheel is secured to an upwardly curved arm 8 which extends laterally over the top of the wheel and carries a pintle 9 disposed in a bearing 10 at the corresponding end of frame member 1. A tubular socket member 11 is disposed at the outer end of each arm 8 for selectively receiving the manipulating handle 12.

The cross frame member 1 has a preferably rectangular vertical opening 13 centrally thereof to receive a complementary post 14 of the pole carrying bolster 15.

The bolster 15 is adapted to be carried by the dolly with the post 14 extending downwardly through opening 13, and comprises a longitudinally extending bar 16 with a pair of laterally spaced angularly diverging upward rollers 17 at each end for receiving and holding a utility pole 18 or other object upon the dolly.

Hooks 19 are provided on cross frame member 1 adjacent each pivot 4 and 5 for securing a chain 20 tightened over the top of the pole.

The steering mechanism 6 employs a parallelogram leverage system which maintains the wheels 2 and 3 in parallel planes at all times and regardless of the angle of steering. For this purpose each arm 8 has secured thereto a forwardly extending steering arm 21 overlying the corresponding wheel in its central vertical plane. The forward ends of arms 21 are maintained at a constant distance apart by a steering tie rod 22 which is pivoted at 23 at each end to the corresponding arm 21.

Figure 5:
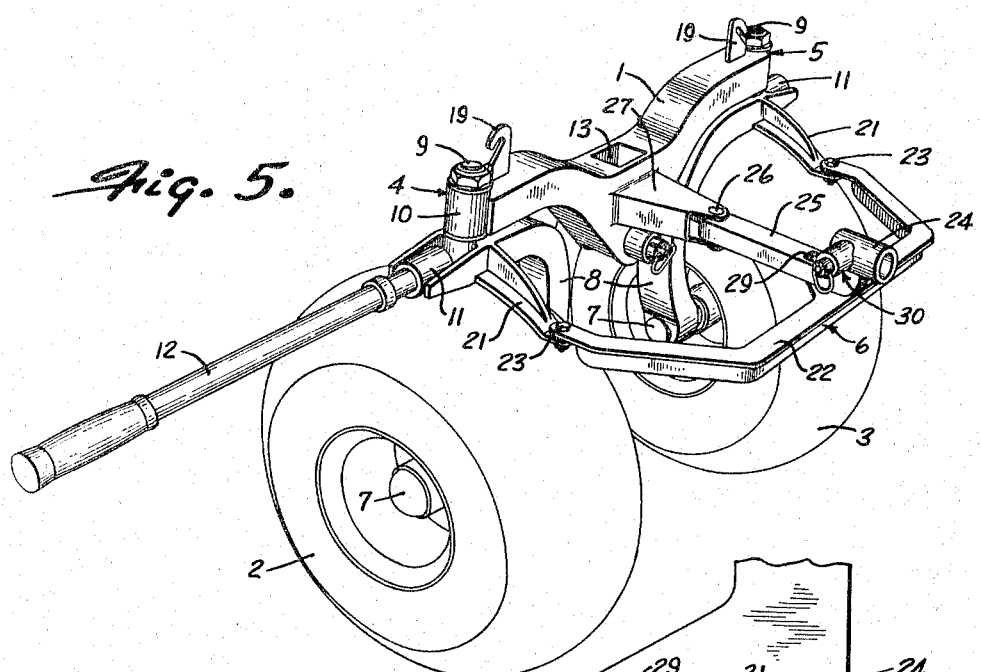
FIG. 5 is a perspective view showing the manipulating handle assembled in one of the side sockets.
Figure 7:
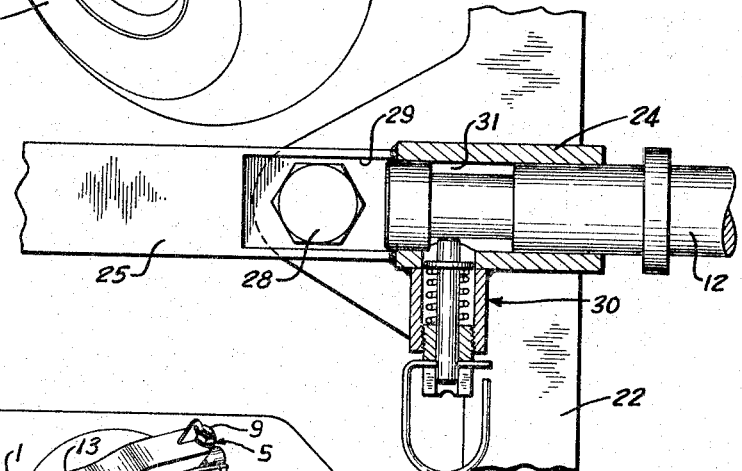
FIG. 7 is an enlarged detail top plan view of the handle fastening portion of the dolly and with parts broken away and sectioned.
Figure 6:
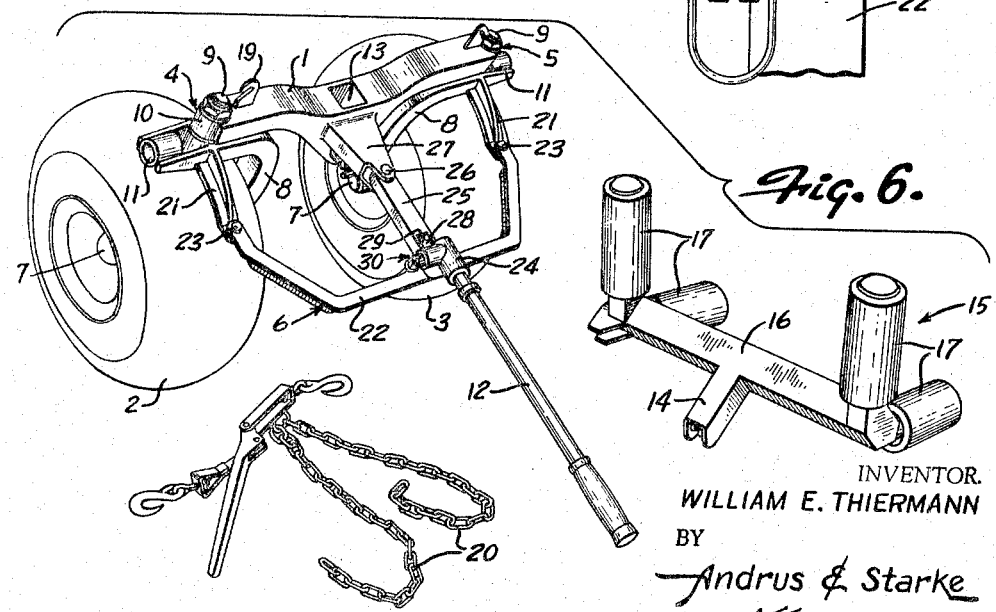
FIG. 6 is a perspective view of the dolly when resting partially upon the manipulating handle and with the pole carrier and chain ready for assembly thereon.

Actuation of either wheel 2 or 3 for steering as when the handle 12 is inserted in the corresponding tubular socket 11, as shown in FIG. 5, will provide an identical actuation of the other wheel by the steering tie rod 22.

In addition to the foregoing steering mechanism the present invention also provides a central socket 24 for the handle 12 and which gives greater leverage and ease of steering. Socket 24 is mounted on the forward end of a longitudinal link 25 which is pivoted at 26 to a forward projection 27 of cross frame member 1 and to the steering tie rod 22 by a vertical bolt 28 centrally disposed on rod 22 and having its head in a recess 29 in link 25. In order to maintain the parallelogram system the distance between the pivot points on link 25, and the forwardly extending steering arms 21 are equal.

The socket 24 preferably has a latch or spring detent 30 which may enter a recess 31 near the inner end of handle 12 when the latter is inserted in the socket to retain the handle as a push-pull member in manipulating the dolly.

Figure 3:
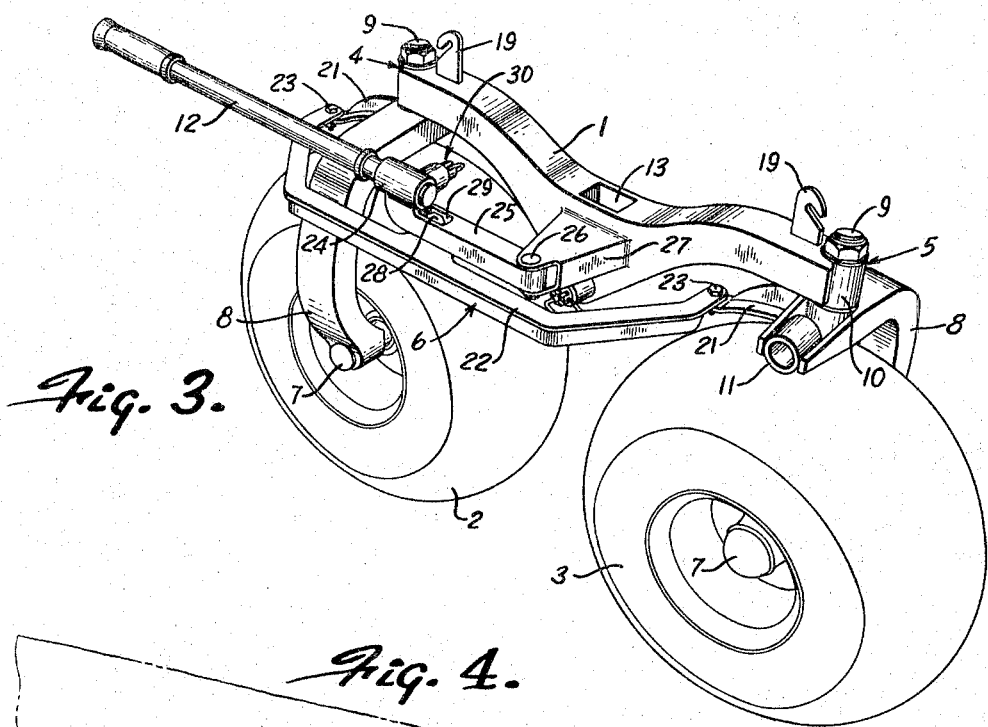
FIG. 3 is a similar view with the wheels directed laterally of the unit.
Figure 4:
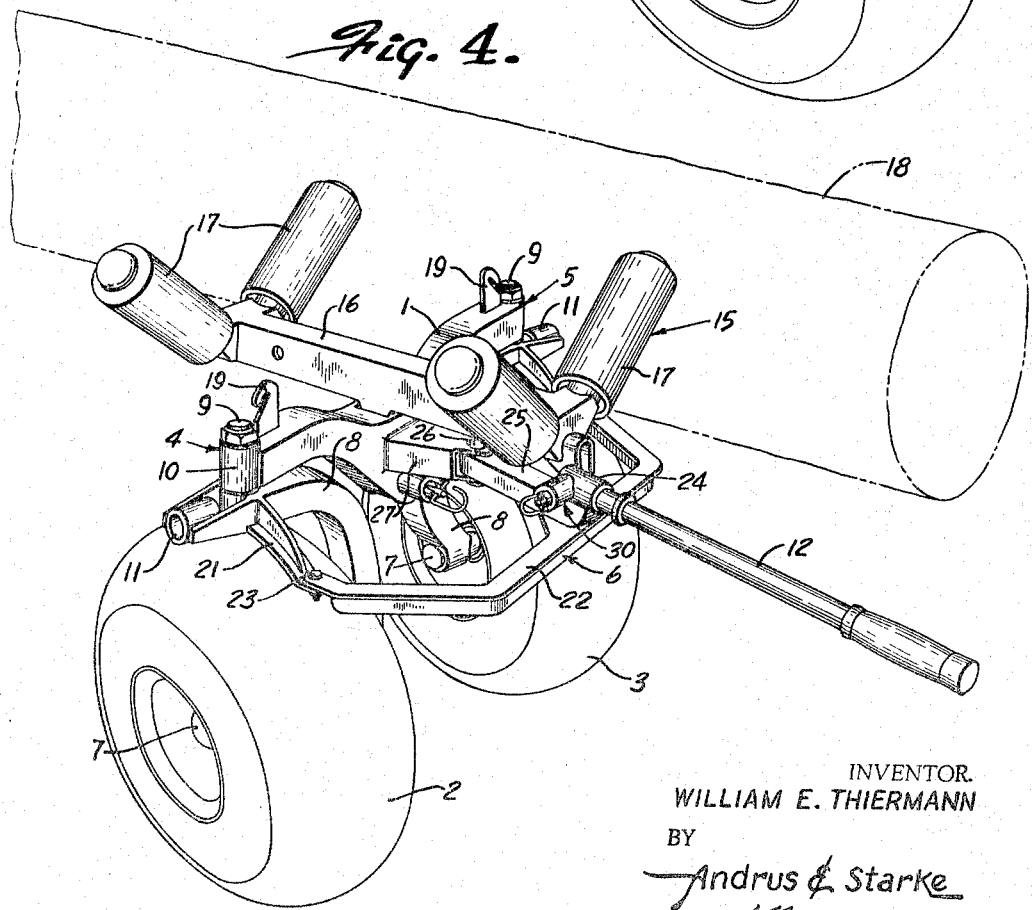
FIG. 4 is a perspective view of the dolly showing a pole carrier mounted thereon and with a pole shown in broken lines.

The dolly construction provides for turning of wheels 2 and 3 in steering through a full 90° angle so that manipulation of a pole is easily accomplished as needed. The wheels may be directed at any angle between the straight ahead position show in FIG. 1 and the transverse position shown in FIG. 3.

Various modes of carrying out the invention are contemplated as being within the scope of the following claims particularly pointing out and distinctly claiming the subject matter which is regarded as the invention.

I claim:

1. A dolly comprising a transverse frame member adapted to support a load, a single pair of wheels supporting said member freely for translation in any direction, a wheel carrying arm pivotally connecting each wheel to a corresponding end of said transverse member upon a vertical axis centrally of the wheel, a steering arm extending forwardly from each of said wheel carrying arms generally in the longitudinal plane of the corresponding wheel, a steering tie rod connecting said steering arms and pivoted thereto at the forward ends thereof to provide a parallelogram system of steering control for said wheels, a link pivotally extending from the center of said transverse frame member and having a length corresponding with the length of said steering arms with its outer end pivotally connected to the center of said steering tie rod, handle means for manipulating said dolly, means to removably secure said handle means to the forward end of said link, and additional means for attaching said handle means selectively to either of said wheel carrying arms.

2. The dolly of claim 1 in which the forward end of said link has a socket for receiving the end of said handle means in securing the latter to said link, and each of said wheel carrying arms has a similar socket for selectively receiving the end of said handle.

3. The dolly of claim 2 in which said socket on said link is directed forwardly of the dolly and the sockets on said wheel carrying arms are directed laterally of the dolly so that the handle extends in a direction corresponding to the socket in which it is secured.

4. The dolly of claim 3 in which means removably secure the handle in the first named socket to provide for push-pull of the dolly by the handle in a forward or backward direction.

References Cited by the Examiner
UNITED STATES PATENTS

| | | | |
|---|---|---|---|
| 687,860 | 12/1901 | Smart | 214—3 X |
| 711,895 | 10/1902 | Hill | 280—47.36 |
| 724,149 | 3/1903 | Whalley | 280—103 |
| 724,579 | 4/1903 | Hysore. | |
| 2,232,550 | 2/1941 | McNamara | 280—445 |
| 2,673,091 | 3/1954 | Planalp | 280—103 |
| 2,948,423 | 8/1960 | Capuano | 214—84 |
| 3,112,037 | 11/1963 | Thiermann. | |
| 3,125,350 | 3/1964 | Thiermann | 214—3 X |

References Cited by the Applicant
UNITED STATES PATENTS 3,112,100   11/1963   Prichard.

KENNETH H. BETTS, *Primary Examiner.*